United States Patent
Gierling et al.

(10) Patent No.: US 6,698,304 B2
(45) Date of Patent: Mar. 2, 2004

(54) METHOD FOR CONTROLLING A DUAL CLUTCH TRANSMISSION

(75) Inventors: Armin Gierling, Langenargen (DE); Andreas Paul, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 23 days.

(21) Appl. No.: 10/247,446

(22) Filed: Sep. 19, 2002

(65) Prior Publication Data

US 2003/0074992 A1 Apr. 24, 2003

(30) Foreign Application Priority Data

Oct. 17, 2001 (DE) .......................................... 101 51 260

(51) Int. Cl.[7] ............................. F16H 3/38; F16H 59/00
(52) U.S. Cl. ........................................... 74/340; 74/335
(58) Field of Search ...................... 74/340, 664, 665 R, 74/665 G, 665 A, 665 B, 335; 477/70

(56) References Cited

U.S. PATENT DOCUMENTS

| | | | | |
|---|---|---|---|---|
| 2,599,801 A | * | 6/1952 | Youngren et al. | .............. 74/330 |
| 4,513,631 A | * | 4/1985 | Koivunen | .................... 74/360 |
| 5,172,602 A | * | 12/1992 | Jurgens et al. | ................. 74/335 |
| 5,890,392 A | * | 4/1999 | Ludanek et al. | ............... 74/331 |
| 5,915,512 A | | 6/1999 | Adamis et al. | ............ 192/3.61 |
| 6,634,247 B2 | * | 10/2003 | Pels et al. | ..................... 74/329 |

FOREIGN PATENT DOCUMENTS

| | | | |
|---|---|---|---|
| DE | 196 31 983 C1 | 2/1998 | .......... F16H/61/04 |
| DE | 197 11 820 A1 | 9/1998 | .......... F16H/61/04 |
| DE | 198 53 824 A1 | 5/2000 | .......... B60K/17/08 |

* cited by examiner

*Primary Examiner*—Roger Pang
(74) *Attorney, Agent, or Firm*—Davis & Bujold, PLLC

(57) ABSTRACT

A method for control of a gear step change in a vehicle having a dual clutch transmission (2) actuatable by a prime mover (4), several gear steps in which a first dividing gear (6) and a second dividing gear (10) can be operatively coupled with the prime mover (4), respectively, by a first clutch (8) and a second clutch (12) and both dividing gears (6, 10) have a common output (14) wherein each dividing gear (6, 10) preferably has several ratio steps and at least two consecutive gear steps of the dual clutch transmission (2) are not associated with the same dividing gear (6, 10). It is proposed that upon a demand for a double downshift, a gear step change occurs within the same dividing gear (6) without the other dividing gear (10) transmitting during the gear step change a torque from the prime mover (4) to the output, and that the torque delivered by the prime mover (4) during the gear step change is essentially used for the acceleration of rotary masses on the side of the prime mover.

2 Claims, 1 Drawing Sheet

METHOD FOR CONTROLLING A DUAL CLUTCH TRANSMISSION

FIELD OF THE INVENTION

The invention concerns a method for control of a dual clutch transmission.

BACKGROUND OF THE INVENTION

Dual clutch transmissions are a special construction form of automated mechanical transmissions with two dividing gears. Conventional automated mechanical transmissions, as a rule designed as countershaft transmissions, have the disadvantage that all shifts proceed with a traction interruption. The traction interruption detracts from the comfort especially during upshifts and at high traction levels. Therefore, different considerations are at work as to how the traction interruption can be prevented or reduced. For example, it is known to actuate transmission systems with the aid of a starter-generator electric motor while the prime mover is separated from the transmission input by a dividing clutch during the change of gear step.

In a dual clutch transmission, two dividing gears are provided wherein the first dividing gear and the second dividing gear can be operatively coupled with the prime mover, respectively, by a first clutch and a second clutch. Each dividing gear is part of a separate power branch. Both power branches are joined upon a common output. Each dividing gear has several optionally shiftable wheel pairs or ratio steps. The ratio steps of both dividing gears are concerted so that two consecutive gear steps are not associated with the same dividing gear. While one gear step is stationarily activated, only the clutch associated with the dividing gear comprising said gear step takes part in the torque transfer. Therefore, while one wheel pair of said dividing gear transmits a torque, the wheel pairs of the other dividing gear are free of torque so that there the wheel pair of the gear step probably activated as next can be thrown into gear by corresponding shifting elements. The actual change of gear step occurs by the clutch of one dividing gear being released and the clutch of the other dividing gear being closed. Therefore, during an overlapping phase, both clutches are for a shift time draggingly involved in the torque transmission so that the gear step change occurs without traction interruption.

In certain driving situations it is necessary to make the maximum possible traction quickly available. If one of the highest gear steps is activated, the maximum traction in many cases can only be made available by downshifting by two gear steps. In the already known dual clutch transmissions, two single downshifts are consecutively carried out in this case. Until the desired gear step is actually activated, there elapses a time felt to be too long in which an intermediate gear step is activated and subsequently deactivated. Besides, under certain circumstances, an increased load of the clutches and of the shifting elements occurs.

DE 198 53 824 A1 has disclosed a dual clutch transmission where a gear step change from the second highest to the highest gear step is possible within the same dividing gear. The traction interruption occurring here can be tolerated due to the low traction level in the highest gears. But the method disclosed here is not provided and adequate for making the maximum traction as quickly as possible upon a traction demand available to the driver and thus to increase the spontaneity of the vehicle to a traction demand.

The problem on which the invention is based is, therefore, to outline a method for control of a double gear step change in a vehicle having one dual clutch transmission where the maximum performance is very quickly made available and where high loads of the clutch or shifting elements are prevented.

SUMMARY OF THE INVENTION

According to the invention, a gear step change occurs upon demand for a double downshift within the same dividing gear without the other dividing gear transmitting a torque from the prime mover to the output during the gear step change. Hereby the torque delivered to the prime mover during the gear step change can essentially be used to accelerate rotary masses on the side of the prime mover and the prime mover rotates within a very short time at a high rotational speed. Until now, this kind of gear change in dual clutch transmissions was knowingly prevented for reasons of comfort due to the traction interruption proceeding therewith. However, the traction interruption at this place surprisingly is not, as generally assumed, felt to be very disturbing. Contrary to the single downshift or upshift, the driver knowingly determines the moment of the double downshift by a very quick depression of the accelerator pedal so that he can be prepared for the brief traction interruption. Besides, by the quick depression of the accelerator pedal the driver knowingly demands a very dynamic reaction of the vehicle; the brief traction interruption together with the quick engine rotational speed acceleration being felt as "sporting".

In an advantageous development of the invention, the clutch of the dividing gear, within which the double downshift takes place, is opened during the gear step change and is not closed again until after the gear step change within the dividing gear has terminated. It is hereby made possible that the prime mover is operated under load during the gear step change so that at the moment when the gear steps change is terminated within the dividing gear, one half of the clutch on the side of the prime mover has at least the same rotational speed as half of the clutch on the side of the dividing gear.

In view of the high rotational speed gradients and of the quick shifting process, it can be advantageous for control or regulation of the engine rotational speed to provide during the gear step change a special engine engagement function which controls the prime mover so that in a first phase of the gear step change a very quick increase in rotational speed occurs.

BRIEF DESCRIPTION OF THE DRAWING

The invention will now be described, by way of example with reference to the accompanying drawings in which.

DETAILED DESCRIPTION OF THE INVENTION

Figure 1:
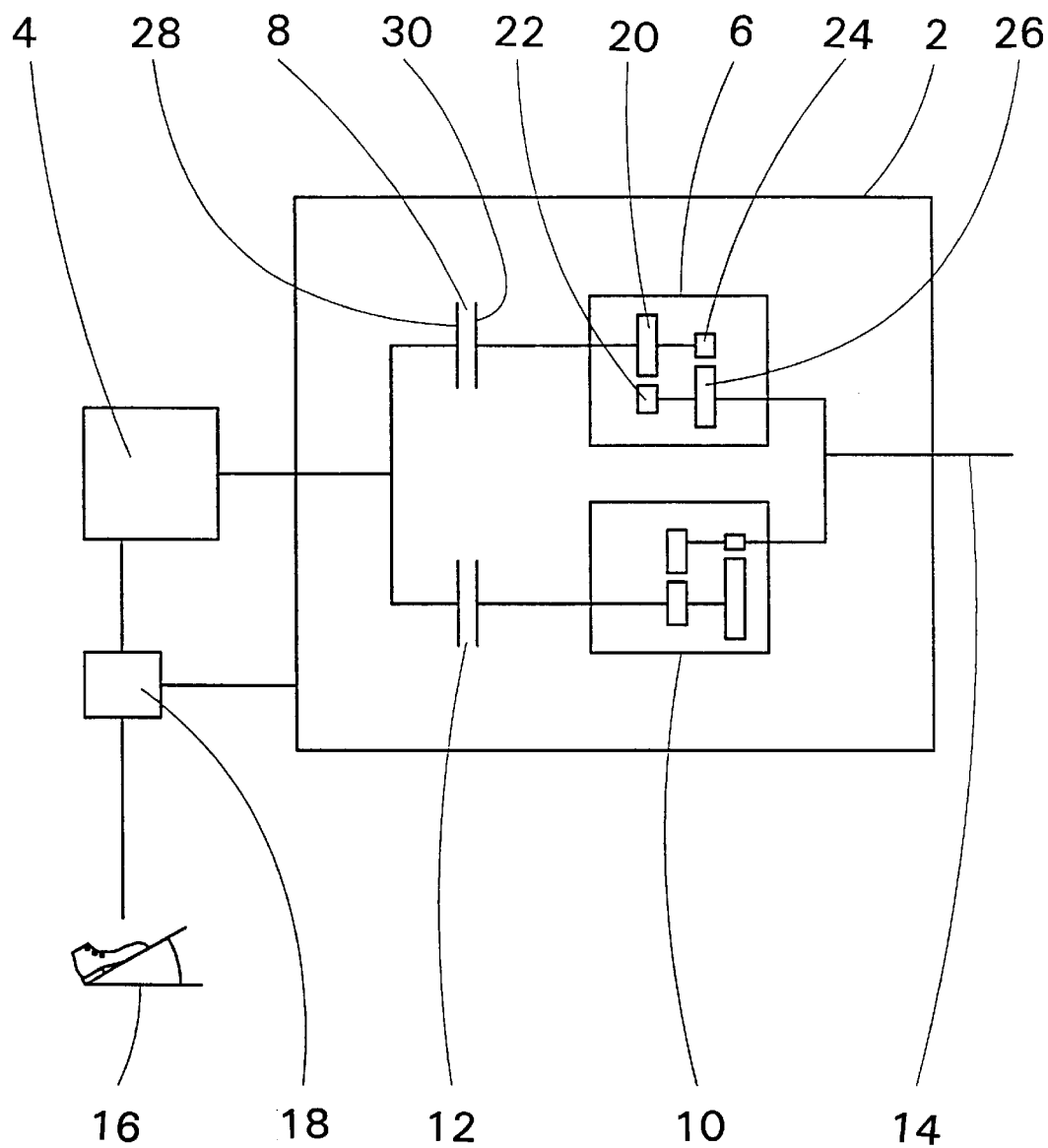
FIG. 1 is a diagrammatic representation of a transmission system with a dual clutch transmission.

Designated in the figure, a dual clutch transmission 2 can be driven by a prime mover 4. The dual clutch transmission 2 comprises a first dividing gear 6 which can be operatively coupled by a first clutch 8 with the prime mover 4. Likewise, a second dividing gear 10 can be operatively coupled with the prime mover by the second clutch 12. Both dividing gears 6, 10 have a common output 14.

The arrangement of the two dividing gears in the dual clutch transmission plays no part in the description of the invention. In the practice, the first and second clutches are often coaxially disposed.

Each one of the dividing clutches 6, 10 has several ratio steps. In the ratio series, adjoining ratio steps are not associated with the same dividing gear so that upon each single gear step change there is shifting from one to the other dividing gear. A double downshift can be demanded by a driver, for example, by very quickly depressing the accelerator pedal 16 by a large amount. An electronic control device 18 converts such an actuation to a demand for a double downshift. If prior to the double downshift the torque has been transmitted from the prime mover 4 to the output 14 via the first dividing gear 6 and the first clutch 8, the clutch 8 is now first opened without the second clutch 12 being closed. A traction interruption occurs and the rotational speed of the prime mover 4 starts to increase. In the dividing gear 6 shifting elements (not shown in detail) disengage a first wheel pair 20, 22 and engage a second wheel pair 24, 26. As soon as said shifting occurs within the dividing gear 6, the clutch 8 is again closed. In the meantime the prime mover 4 has been operated under load so that the half on the side of the prime mover of the half 28 of the clutch 8 has at least the same rotational speed as the half 30 on the side of the dividing gear of the clutch which, of course, is connected with the output 14 via the wheel pair 24, 26.

What is claimed is:

1. A method for control of a gear step change in a vehicle having a dual clutch transmission (2) actuatable by a prime mover (4), a plurality of gear steps in which a first dividing gear (6) and a second dividing gear (10) selectively operatively coupled with said prime mover (4) respectively by a first clutch (8) and a second clutch (12), both dividing gears (6, 10) having a common output (14), each dividing gear (6, 10) having a plurality of ratio steps, at least two consecutive gear steps of said dual clutch transmission (2) not associated with the same dividing gear (6, 10), wherein upon demand for a double downshift, a gear step change takes place within the same dividing gear (6) without the other dividing gear (10) transmitting, during the gear step change, torque from said prime mover (4) to said output (14), and wherein the torque delivered by said prime mover (4) during the gear step change is used for acceleration of rotary masses downstream of said prime mover.

2. The method according to claim 1, wherein the first clutch (8) of said dividing gear, within which the double downshift occurs is open during the gear step change and not closed again until after the gear step change occurs within said dividing gear (6).

* * * * *